United States Patent
Brothers et al.

(10) Patent No.: US 6,977,996 B1
(45) Date of Patent: Dec. 20, 2005

(54) FEE COLLECTION SYSTEM AND METHOD FOR CALL COMPLETION

(75) Inventors: Laurence Raphael Brothers, Waltham, MA (US); Vittorio Giuseppe Bucchieri, Wakefield, MA (US); Yohan Rajan, Irving, TX (US); Robert Anthony Virzi, Wayland, MA (US); Allison Dana Jaynes, New City, NY (US); David Anthony Philbin, Arlington, MA (US); James Edward Haley, Aston, PA (US); Bernadette Anita Nelson, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 214 days.

(21) Appl. No.: 10/253,755

(22) Filed: Sep. 24, 2002

(51) Int. Cl.$^7$ .................. H04M 15/00; H04M 1/56
(52) U.S. Cl. .................. 379/114.05; 379/127.03; 379/127.06; 379/142.02
(58) Field of Search .................. 379/111, 114.01, 379/114.05, 112.22, 120, 121.01, 121.02, 379/142.01, 142.02, 142.04, 142.05, 142.06

(56) References Cited

U.S. PATENT DOCUMENTS

| | | | |
|---|---|---|---|
| 5,369,699 A * | 11/1994 | Page et al. | 379/38 |
| 6,259,779 B1 * | 7/2001 | Council et al. | 379/121.01 |
| 6,353,663 B1 * | 3/2002 | Stevens et al. | 379/114.22 |
| 6,483,910 B1 * | 11/2002 | Council | 379/127.01 |
| 6,763,095 B1 * | 7/2004 | Cermak et al. | 379/93.23 |

* cited by examiner

*Primary Examiner*—Binh K. Tieu
(74) *Attorney, Agent, or Firm*—Leonard C. Suchyta, Esq.; Joel Wall, Esq.; Rader, Fishman & Grauer

(57) ABSTRACT

Methods and systems for administering calls on a voice network allow a user to selectively determine which calls will be accepted. The methods and systems may provide unwanted callers with an option to speak with the user for a fee. The methods and systems may provide an initiator of the communication to accept the fee, to confirm acceptance of the fee and to provide payment information for the fee prior to completing the communication. If the initiator does not accept the fee, the communication can be terminated. The methods and systems may verify the payment information and display a verification notice to the user prior to completing the call. The fee to be paid and the method of payment, or payment information may be prescribed by the user.

22 Claims, 1 Drawing Sheet

FEE COLLECTION SYSTEM AND METHOD FOR CALL COMPLETION

RELATED APPLICATIONS

This application is co-pending with related patent applications entitled "Automated Communications Assistant and Method" and "Unified Messaging System and Method", each having at least one co-inventor and assignee in common with the instant application, and both being filed concurrently herewith and incorporated by reference herein in their entirety.

1. Field of the Invention

The systems and methods relate to communication networks, and more particularly to administering communications on a network to obtain payment for completing a communication.

2. Background

Voice networks in current use may provide a range of features for administering calls on the network. For incoming calls, a caller identification feature can display the caller's name or number to a user to allow the user to screen unwanted calls. Additional features may allow a user to block selected callers or to accept calls only from selected callers. Unidentified calls may be intercepted and the callers may be requested to identify themselves. The information is recorded and provided to the user, who may decide to accept or decline the call. When the user is not able to accept a call, the caller may leave a message, or the call may be forwarded to a number selected by the user. The user may also dial a code to return a missed call, or to reconnect to a previous incoming call. For outgoing calls, the user may have the network repeatedly dial a number that the user could not access and provide the user with a signal when the number has been reached. Network users may also choose to block their own caller identification information from being displayed to the receiver.

While the above features may provide increased functionality and convenience for the networks in which they are employed, there may be a number of instances where these networks do not provide the functionality and convenience that some users may require. As an example, the features may be difficult to implement, requiring a user to remember access codes and/or requiring substantial user input. Other limitations may exist when users block their own caller identification information, in that the block may prevent all call recipients from access to the information. Also, a user may not be available to respond to the signal when the network has finally connected with a number that could not be accessed. Oftentimes, the caller identification information is insufficient for the user to make an intelligible decision to receive the call or not. These limitations and others as perceived by the users of current networks may decrease the overall number of subscribers to such networks.

SUMMARY OF THE INVENTION

A method and system for administering communications on a network allows a user to selectively determine which calls will be accepted and assists the user in placing calls to other users on the network. The user may establish a list of users whose calls will be accepted and may also establish a list of users whose calls will not be accepted. The method and system may provide unwanted callers with an option to speak with the user for a fee. Users may establish "business card" headers, or profiles, which serve to identify the user to a called party. The user may also maintain profiles for received calls by using the "business card" header provided by the caller, or by inputting caller profiles. The method and system may also be used in conjunction with a scheduling system, such that calls amongst two or more users will be initiated at an agreed upon time.

Embodiments may comprise methods and systems for completing a communication by interfacing a user with the communication at a user terminal, determining if identification information is available for the communication, and obtaining a fee for completing the communication with the user at the user terminal when the identification information for the communication is not available. The methods and systems may prompt an initiator of the communication to accept the fee, to confirm acceptance and to provide payment information for the fee prior to completing the communication. If the initiator does not accept the fee, the communication can be terminated. The methods and systems may verify the payment information and display a verification notice to the user prior to completing the communication. The fee to be paid and the method of payment, or payment information may be prescribed by the user. A dual tone multi-frequency tone collector, a text-to-speech converter, and/or a speech recognition system may be utilized to prompt the initiator and/or obtain input from the initiator.

DETAILED DESCRIPTION OF CERTAIN ILLUSTRATED EMBODIMENTS

Figure 1:
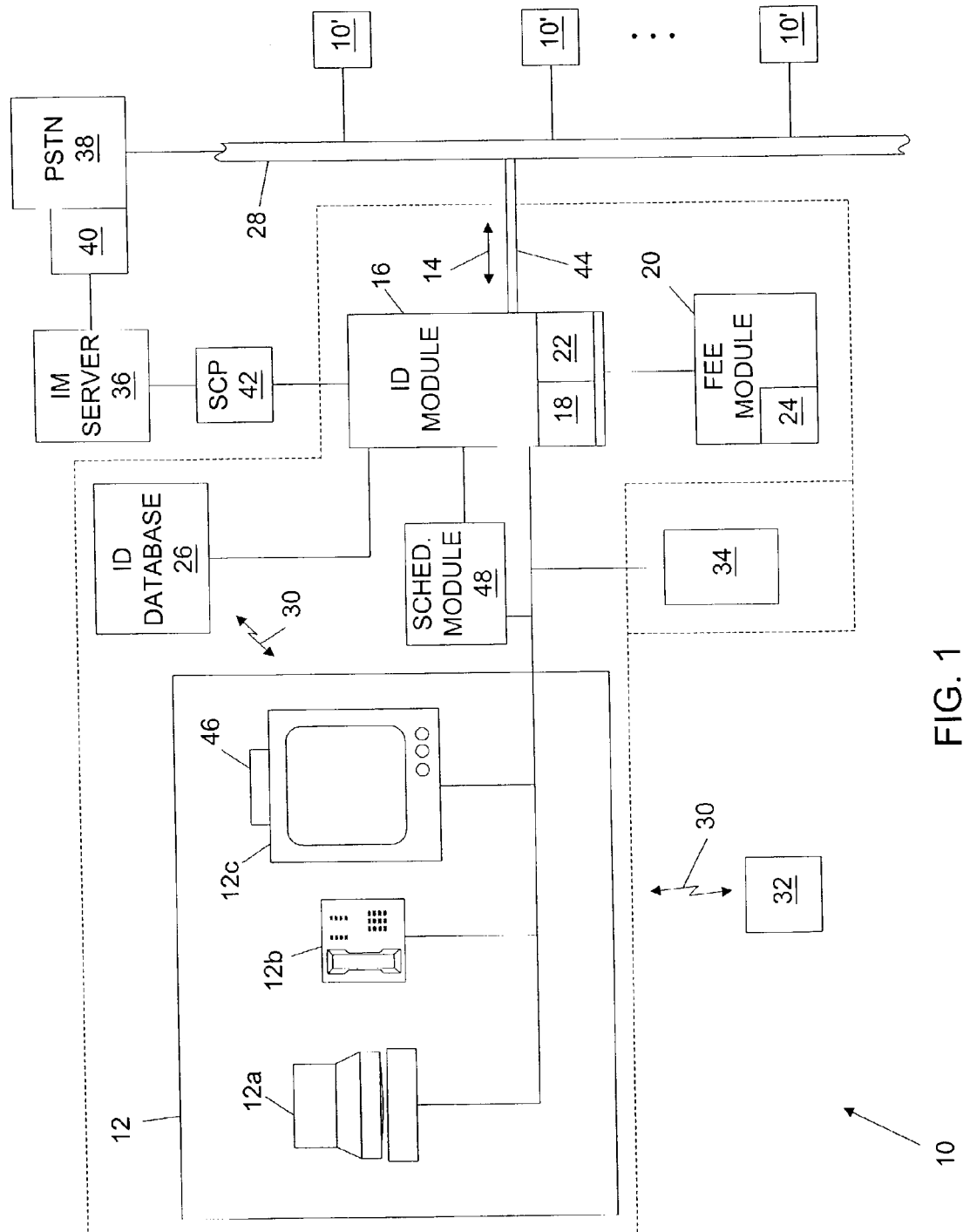
FIG. 1 depicts a schematic representation of an illustrative embodiment of a system for administering communications understood as illustrative and not as limiting in any way.

Referring to FIG. 1, there is shown a schematic representation of a system 10 for administering communications over a network. The system 10 may include modules for administering communications incoming to and outgoing from a user terminal 12. The user terminal 12 may be a processor, such as a computer workstation, a handset, a cellular phone, a video transceiver, or other such terminal, port, interface or input/output device, or combinations thereof, wherein a user can connect to a communications network. For the embodiment shown in FIG. 1, terminal 12 may include a computer workstation 12a, a phone 12b and a video display, or television 12c. The system 10 may be described in terms of voice communications, though it can be understood that the communications may be voice, video, text, or combinations of these or other communications protocols as are known.

An incoming communication, or call, from a communication initiator, or caller, illustrated by arrow 14 in FIG. 1, may first be routed through an identification (ID) module 16. ID module 16 may operate in the manner of existing caller identification technology as may be known in the art. In one example implementation, system 10 may utilize known Advanced Intelligent Network (AIN) capabilities supplemented with additional functionality. In the following description, the AIN implementation may be described, but it is understood that other implementations of system 10, such as Session Initiation Protocol (SIP) and/or Internet Protocol (IP) may be used.

ID module 16 may include a terminating AIN Trigger 18, such that incoming calls to ID module 16 may query AIN, and service logic within ID module 16 may analyze the caller identification information, or caller ID, as is known.

The calls received at ID module 16 may include calls that the user would accept if the caller ID was available, e.g., calls from family and/or friends who have chosen to block their caller ID.

When ID module 16 determines that the caller ID is unavailable or private, ID module 16 may prompt the caller to remove the caller ID block by pressing a code. If the caller chooses to press the code and unblock the caller ID information, ID module 16 may further process the call to determine if the call should be accepted. The code pressed by the caller may be a personal identification number recognized by ID module 16 and associated with callers for which ID module 16 will complete the call, as is known in the art. If the caller is also a user of the system 10, the caller may transmit a caller profile (as may be described in further detail below) by pressing the code. In one embodiment, the code may correspond with that which the caller would use to deactivate their caller ID block. The ID module 16 may also allow callers to record a message, in lieu of, or in addition to unblocking the caller ID information, to which the user may listen in order to determine if the call is to be accepted.

When ID module 16 determines that the caller ID is unavailable or private and the caller does not unblock the caller ID information or has not recorded a message, the call may be routed to fee module 20. Fee module 20 may inform the caller that the call may not be completed unless the caller wishes to pay a fee for completing the call. Fee module 20 may then prompt the caller to select a payment option or to terminate the call. If the payment option is selected, an announcement can inform the caller that they will be charged a specified fee to complete the call and the caller may be given the option of confirming the charges by pressing a key, or of terminating the call.

The fee may include a flat fee connection charge, a per minute rate, or other fee or rate, or combination of fees and rates, as may be preselected by the user. Depending on the fee structure selected, payment of the fee may simply allow the call to be put through to the user, or the fee may provide the caller with a minimum of call time with the user. Alternatively, the announcement of the charges may be provided with the prompt to select the payment option and, if selected, the caller may be requested to press a key to confirm the choice or terminate the call.

If the payment option is confirmed, the caller can be billed and the user's account can be credited in the manner of known methods for call and service charges, such as, but not limited to, 900 number calls, *69 call back service, 411 information service, calling card calls, or credit card charges. The payment method may be preselected by the user of system 10, or the caller may be prompted to choose the method for making the payment. Depending on the payment method, system 10 may prompt the caller to input payment information, such as credit card number, billing number, etc. The payment information may be verified prior to completing the call, for example, in the known manner of verifying credit card purchases. If the payment information cannot be verified, system 10 may terminate the call. It may be also noted that, depending on the fee structure selected by the user, no fee will be charged if the call cannot be completed, or the user does not accept the call, or the user terminates the call prior to the specified minimum time.

In one embodiment, ID module 16 may include a voice portal 22. Voice portal 22 may be a part of a Direct Inward Dialing (DID) service that can terminate on a media server 24. The media server 24 may be a known server type, such as a voice webserver, that can play prompts, collect dual tone multi-frequency (DTMF) tones, recognize speech, and do text-to-speech (TTS) script. Incoming calls to the DID are transferred to the voice portal 22, which may be capable of transferring the call to one or more telephone numbers based on a set of rules, or routing the call to voice mail, as is known. For incoming calls without a caller ID, portal 22 may direct the call to media server 24 within ID module 16. Typically, media server 24 may use an XML platform to query the caller as provided above. Fee module 20 may utilize media server 24 in providing the payment prompts and obtaining payment information from the caller.

Thus, the identification information for the communication determined by ID module 16 can be seen to include the caller ID and/or type of caller based on the caller ID or lack thereof, the unblocking code, the "message" or "fee" caller indications, and/or other indications associated with the communication, e.g., "unidentified", "out of area" and/or "not available" indications. Once ID module 16 may have determined the identification information for the communication, ID module 16 may search a user input ID database 26 for matching ID information. ID database 26 may include listings of callers, or types of callers, e.g., "unidentified", "fee", or "message" callers, for which the user may have identified actions that system 10 may take in administering their incoming calls. For callers whom the user has previously determined to always accept calls from, ID module 16 may connect the call directly. For example, the user may wish to have "message" and "fee" type callers connected directly. For other identified callers, ID module 16 may display the caller ID and/or the ID information from ID database 26 to the user such that the user may decide to accept the call or not. Alternatively, the caller may be directed to voice mail, or forwarded to a predetermined number, or a predetermined message may be played to the caller, depending on the identified action associated with the ID information in ID database 26.

The actions, or call routings listed can be illustrative of actions a user may associate with the caller ID information, though it can be understood that other actions, without limitation to the listed actions, may be supported by system 10. For callers so identified, the predetermined message may inform the caller that their call is not being accepted. If the user has chosen to have the caller ID displayed when no caller ID information is contained within ID database 26, the caller ID can be so noted when displayed to the user. When the caller has recorded a message, or has selected a payment option, the system 10 can display a "message" or "fee" notification to the user as the caller ID.

When the caller ID and/or ID information is displayed to the user, the user may optionally answer the call, terminate the call, send the call to voice mail, or take other actions as determined by the user and as known in the art. The user may also choose to have the caller ID information added to or deleted from ID database 26, together with a selected action to be taken for future calls from the caller. A lockout feature of system 10 may allow users to simply press a particular button on the phone 12b, workstation 12a, or other user interface of system 10, during or immediately after an offending call, and the caller may be entered into ID database 26 as one of a list of callers not to be accepted. It is noted that similar additions, deletions or lockouts may be performed in conjunction with calls initiated by the user. It may be understood that the user of system 10 may optionally initiate or terminate one or more of the features of system 10 as described above. As an example, the user may not wish to provide callers with a "message" feature or "fee" feature, or the user may wish to initiate only one of those features, or may choose to terminate one or both of the features after they may have been initiated.

In a network setting, i.e., where system 10 may be part of a network of such systems 10', indicated as network 28 in FIG. 1, system 10 may inform network 28 that the user has decided to have the caller locked out of system 10. A predetermined number of lockouts by systems 10' on the network 28 may cause the network 28 to lockout the caller from the network 28. The lockout may apply to the caller only, or may be applied to the carrier or service provider used by the caller.

The ID information within ID database 26 may include information in addition to that normally associated with known caller ID systems. The user may establish caller profiles to provide additional information to the user when the caller ID is displayed. As an example, information such as may be found in an email contact list may be input to ID database 26 for a caller profile. In the embodiment of FIG. 1, system 10 may provide connectivity between workstation 12a, phone 12b and television 12c. Thus, ID database 26 may link to email contact information from an email application on workstation 12a, such that the email contact information may be used to inform the user of incoming calls and to display caller ID information.

The system 10 may also maintain a user profile within ID database 26 that may be, at the user's option, attached to user initiated communications. In addition to user identification information, the user may also include information about the purpose of the call, or communication. In this manner, the user can provide the called party with more information about the call and the user may thus be more likely to have the communication accepted.

The user and caller profiles can frame a call or message with context information about the user or caller(s) and may also provide information about the communication itself, e.g., the purpose of the communication. Textual information may be supplemented with voice data, video data, or other form of data as may be appropriate to the communication.

The amount of information that may be displayed to a called party can depend on the kind of communication equipment the called party presents to the system 10. With a workstation, such as 12a, or other device having a visual display, the called party may receive the full information of the profile. Where a called party may not present a visual display, the profile may be communicated by voice, either as input by the user, or as a text-to-speech translation of the profile, as may be constructed using portal 22 and media server 24, in a manner similar to that described previously for querying incoming calls.

Where system 10 operates in an IP based environment, or a SIP based environment, or another environment wherein linking can be utilized, the profile may be presented as a link, illustrated by arrow 30, to the profile record within ID database 26, or to other records that may contain profile information. For the SIP environment, the SIP INVITE may be extended to carry the link information. It can be appreciated that link 30 may be merely illustrative of the connectivity between terminal 12 and web sites, servers, databases, or the like, that may be accessed in an IP environment, and need not depict actual connection paths.

In a conference call setting, the system can display profiles for the participants of the conference call. In such a setting, the link 30 may be to a web site 32, established for the call, with the participants' profiles and conference information being accessible at the site 32. The site 32 may be established by one of the participants of the conference, or by someone designated thereby, who may also determine the information to be contained therein. Other site establishment and site information protocols may be determined among the participants prior to, or during the conference call.

When the conference call may include participants outside system 10, authentication of caller identities may be provided by the use of digital certificates as provided by Public Key Infrastructure (PKI) 34. PKI 34, as known in the art, may enable users of a system 10, connected to an unsecure network, such as may be illustrated by network 28, to securely and privately exchange data. The digital certificate can identify an individual or an organization and a certificate authority of PKI 34 can provide directory services that can store and, when necessary, revoke the certificates.

The system 10 may operate in the manner of instant messaging (IM) systems, as are known for email messaging between workstations, or as may be known for cellular short message service. In this case, the caller may be a system user and may transmit an IM message via a workstation, or text capable phone to an IM server 36. The IM message may be transported from the IM server 36 to a public switched telephone network (PSTN) 38 via a signaling gateway 40. The PSTN 38 can terminate at the end user's line, i.e., at system 10, optionally via network 28, as illustrated in FIG. 1. When ID module 16 receives the IM message call, it may launch, for the example AIN implementation of FIG. 1, an AIN query to a service control point (SCP) 42. The SCP 42 performs a GETDATA query to IM server 36 that will return the text message to the SCP 42. The SCP 42 returns a Display Text message to the terminating line. System 10 can read the message, including the message heading, and may include the message and heading with the ID information provided to the user. It can be understood that for implementations of system 10, other than the example AIN implementation of FIG. 1, e.g., SIP and IP implementations, IM server 36 may interface with the appropriate hardware and/or software, as may be known in the art.

System 10 may further include features to provide "buddy list" capabilities as are known to be provided by Internet Service Providers. The ID database 26 may include one or more such buddy lists, which the user may use to designate those callers from whom calls may always be accepted. In addition, the user can allow callers on a "buddy list" or "availability list" to see when the user may be actively connected to the system, either via the workstation 12a, phone 12b, or other system connection, as well as notifying the user when a caller from the list may be connected to their system. The feature need not be tied to a particular phone or workstation or location, but may be accessed from other connection ports to system 10, e.g., internet connections, PSTN connections, or other connections as may be known. The notification may be at the workstation, or may be through a text capable phone display, or other display means connected to system 10.

In one embodiment, the display means may include television 12c, as shown in FIG. 1. Television 12c may display broadcast, satellite, cable, or other television signals. In a preferred embodiment, system 10 may include a broadband connection 44 having phone, television and internet connectivity. The broadband connection 44 may be illustrative of the types of connections that may be used for system 10, though other connections, such as modem connections, Digital Subscriber Lines (DSL), satellite connections, or combinations of these may be used without limitation on the features of system 10. Television 12c may receive television signals through such a connection, and/or may receive direct broadcast television signals. For illustrative purposes, the television signals received by television 12c may also be referred to herein as broadcast signals.

For system 10 of FIG. 1, television 12c may use available technology to display a unified messaging (UM) system "mailbox" in addition to television signals. The caller ID information provided by ID module 26 may be in the form of video and/or audio signals to be displayed at the UM mailbox of television 12c. Additionally, text-based phone messages may be displayed. Picture-in-picture capability, as is known in the art, can allow the user to monitor the mailbox while watching the primary display and switch between the primary display and the system 10, or mailbox display. Depending on user preferences, incoming voice messages may interrupt the audio portion of the primary display, or voice messages may also be retrieved when the UM mailbox is activated as the primary display.

System 10 may also provide a tone or icon over the display being viewed by the user when a new message has arrived, e.g., in the known manner of displaying channel numbers. The user may switch to the UM mailbox display, e.g., by switching to a specified channel to select the workstation display. System 10 may include speech recognition and text to speech technologies such that voice messages may be displayed as text, or conversely, text messages may be presented as voice messages.

Depending on the interactivity provided by connection 44, the user may reply to messages, including voice messages, the user may simply acknowledge receipt, or may delete messages. In one embodiment, the user may transfer messages from one display device to another. For example, the user may decide to remove messages from television 12c and thus may transfer messages displayed on television 12c to workstation 12a, phone 12b, or another connected device for later retrieval. Depending on the interactivity, system 10 may provide output to the user through one or more, or combinations of, audio or visual display devices. As an example, in addition to the tones and/or icons that may be provided on television 12c, a tone may be inserted into a radio program the user may be listening to. If the user chooses to select and display messages, or otherwise interact with the system 10 message, system 10 may pause the audio, visual, or audio/visual display devices, or system 10 may record output from the devices for later retrieval by the user.

The user can use a remote control or other controller 46 to select and display messages that are listed in the UM mailbox. In an embodiment using a broadband connection, the UM system may provide interactivity through television 12c and its associated controller 46. In one embodiment, the controller 46 may use an infrared signal to also control the operation of workstation 12a, such as is known for wireless mouse operations. In one embodiment, controller 46 may be a set-top box, such as a cable box. In this embodiment, the set-top box may provide interactive control with a UM service provider residing on a remote server.

System 10 may include known communications administering techniques for repeatedly dialing a number that the user may have tried unsuccessfully to access and then notifying the user when the connection may become available. In addition to such known techniques, system 10 may operate to schedule communications between parties using schedule module 48. In doing so for communications between parties using system 10, schedule module 48 may utilize the "buddy list" as previously described to determine when the party trying to be accessed by the user may be available. The schedule module 48 may detect the presence of the party and may query the party being called to determine if the party may be available to accept the communication. If so, the schedule module 48 may initiate the call by first notifying the user that the party is available.

To mitigate situations where the original user may no longer be available to communicate, the schedule module 48 may negotiate a time at which the user and the party may both be available to complete the communication. In a manner similar to obtaining contact information from an email system, as described previously, the schedule module 48 may have access to user schedules, such as would be maintained within an email system. Schedule module 48 may then schedule the communication at a time or times when both parties may be available. The system may request confirmation of availability prior to finalizing the time for the communication.

When schedules may not be available, such as when one party is not a system user, schedule module 48 may query the party or parties to determine suitable times for scheduling the communication. The queries may be in the form of voice queries, IM queries, or the like, and may be initiated through voice portal 22 and media server 24 in a manner similar to that described for querying incoming calls.

The system 10, and methods thereof, described herein are not limited to a particular hardware or software configuration, and may find applicability in many computing or processing environments. The systems and methods can be implemented in hardware or software, or a combination of hardware and software. The systems and methods can be implemented in one or more computer programs executing on one or more programmable computers, such as may be exemplified by workstation 12a, that include a processor, a storage medium readable by the processor (including volatile and non-volatile memory and/or storage elements), one or more input devices, and one or more output devices. In one embodiment, the systems and methods may be implemented on a computer in a network, or the computer may be a softswitch or a server in a phone network, such as may be exemplified by network 28 or PSTN 38. User control for the systems and methods may be provided through a telephone user interface that may be incorporated with an Internet Service Provider user interface.

The computer programs, or programs, may be preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in FIG. 1 are merely for illustrative purposes, and can be varied accordingly and components may be combined or otherwise reconfigured without departing from the scope of the disclosed systems and methods.

Accordingly, the ID module 16, fee module 20, ID database 26, schedule module 48, or combinations thereof may be incorporated within user terminal 12. User terminal 12 may be a multifunctional component incorporating the workstation 12a, phone 12b and television 12c into a single unit, or combinations of units. The aforementioned changes are also merely illustrative and not exhaustive, and other changes can be implemented without affecting the ability of the system 10 to administer communications for a user. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method for completing a communication, the method comprising:
   interfacing a user with the communication at a user terminal;
   determining if identification information is available for the communication;
   if the identification information for the communication is not available, prompting an initiator of the communication to perform at least one of: provide the identification information, and record a message to be sent to the user; and
   obtaining a fee from the initiator for completing the communication with the user at the user terminal if the initiator failed to perform said at least one of: provide the identification information, and record a message to be sent to the user.

2. The method of claim 1, wherein obtaining the fee comprises prompting the initiator of the communication to accept the fee prior to completing the communication.

3. The method of claim 2, wherein prompting the initiator to accept the fee comprises prompting the initiator to confirm acceptance of the fee.

4. The method of claim 2, comprising terminating the communication if the initiator does not accept the fee.

5. The method of claim 2, wherein obtaining the fee comprises prompting the initiator to provide payment information for collecting the fee when the initiator accepts the fee and prior to completing the communication.

6. The method of claim 5, wherein obtaining the fee comprises verifying the payment information provided by the initiator prior to completing the communication.

7. The method of claim 6, comprising displaying a notice to the user that the payment information is verified.

8. The method of claim 7, wherein obtaining the fee comprises accepting input from the initiator in the form of at least one of dual tone multi-frequency tones, text input and voice input.

9. The method of claim 5, comprising preselecting, by the user, the payment information to be provided.

10. The method of claim 1, comprising preselecting, by the user, the fee to be obtained.

11. A method to obtain a fee for completing a communication, comprising:
    interfacing a user with the communication at a user terminal;
    determining if identification information is available for the communication;
    if the identification information for the communication is not available, prompting an initiator of the communication to perform at least one of: provide the identification information, and record a message to be sent to the user;
    prompting the initiator of the communication, if the initiator failed to perform said at least one of: provide the identification information, and record a message to be sent to the user, to accept the fee, to confirm acceptance of the fee and to provide payment information for the fee;
    verifying the payment information provided by the initiator; and
    displaying a notice to the user that the payment information is verified such that the user can complete the communication.

12. A fee collection system for completing a communication, comprising:
    a terminal to interface a user with the communication;
    an identification module to determine if identification information is available for the communication;
    a prompting device to prompt an initiator of the communication, if the identification information for the communication is not available, to perform at least one of: provide the identification information, and record a message to be sent to the user; and
    a fee module to obtain a fee from the initiator for completing the communication with the user at the terminal if the initiator failed to perform said at least one of: provide the identification information, and record a message to be sent to the user.

13. The system of claim 12, wherein the fee module comprises a media server to prompt the initiator of the communication to accept the fee.

14. The system of claim 13, wherein the media server comprises payment prompts to obtain payment information for collecting the fee from the initiator.

15. The system of claim 14, wherein the media server comprises at least one of a dual tone multi-frequency tone collector, a text-to-speech converter and a speech recognition module to prompt the initiator and accept input from the initiator.

16. The system of claim 14, wherein the media server comprises verifying means to verify the payment information.

17. The system of claim 16, comprising a terminator to end the communication when the payment information is not verifiable.

18. The system of claim 17, comprising a display to inform the user that the payment information is verified.

19. The system of claim 13, wherein said prompting device is said media server.

20. A method of completing a communication, the method comprising:
    interfacing a user with the communication at a user terminal;
    determining if caller identification information is available for the communication, the caller identification information including at least a telephone number from which the communication is initiated;
    if the caller identification information for the communication is determined to be unavailable, prompting an initiator of the communication to provide the caller identification information by removing a caller identification block; and
    obtaining a fee from the initiator for completing the communication with the user at the user terminal if the initiator fails to remove the caller identification block.

21. The method of claim 20, further comprising prompting the initiator of the communication to provide a recorded audio message to be sent to the user prior to completing the communication as an alternative to removing the caller identification block.

22. The method of claim 20, further comprising:
prompting the initiator of the communication to accept the fee prior to completing the communication;
prompting the initiator of the communication to confirm acceptance of the fee prior to completing the communication;
prompting the initiator of the communication to provide payment information prior to completing the communication;
verifying the payment information provided by the initiator prior to completing the communication; and
displaying a notice to the user that the payment information is verified prior to completing the communication.

\* \* \* \* \*